United States Patent
LaFayette et al.

(10) Patent No.: US 11,113,880 B1
(45) Date of Patent: Sep. 7, 2021

(54) SYSTEM AND METHOD FOR OPTIMIZING THE RENDERING OF DYNAMICALLY GENERATED GEOMETRY

(71) Applicant: Facebook Technologies, LLC, Menlo Park, CA (US)

(72) Inventors: Pierre-Antoine Benoit LaFayette, Sunnyvale, CA (US); Rémi Palandri, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/518,703

(22) Filed: Jul. 22, 2019

(51) Int. Cl.
*G06T 17/20* (2006.01)
*G06F 3/01* (2006.01)

(52) U.S. Cl.
CPC .............. *G06T 17/20* (2013.01); *G06F 3/013* (2013.01); *G06T 2210/36* (2013.01)

(58) Field of Classification Search
None
See application file for complete search history.

(56) References Cited

U.S. PATENT DOCUMENTS

| 6,765,574 | B1 * | 7/2004 | Mao | G06T 17/005 345/423 |
| 2005/0012742 | A1 * | 1/2005 | Royan | G06F 30/13 345/419 |
| 2016/0091720 | A1 * | 3/2016 | Stafford | G02B 27/0068 345/8 |
| 2018/0275410 | A1 * | 9/2018 | Yeoh | G02B 27/0172 |
| 2020/0019590 | A1 * | 1/2020 | Rimmer | G06F 40/103 |

* cited by examiner

*Primary Examiner* — Edward Martello
(74) *Attorney, Agent, or Firm* — Baker Botts L.L.P.

(57) ABSTRACT

Particular embodiments described herein present a technique for mesh simplification. A computing system may receive a request to render an image of a virtual scene including a virtual object. The system may determine one or more positions of the virtual object relative to one or more of a foveal focus point or a lens, respectively. The system may determine a screen coverage size of the virtual object. The system may then determine a simplification level for the virtual object based on the determined position(s) and the screen coverage size of the virtual object. The system may generate a mesh representation of the virtual object based on the determined simplification level, where the number of polygons used in the mesh representation depends on the determined simplification level. The system may render the image of the virtual scene using at least the generated mesh representation of the virtual object.

19 Claims, 9 Drawing Sheets

SYSTEM AND METHOD FOR OPTIMIZING THE RENDERING OF DYNAMICALLY GENERATED GEOMETRY

TECHNICAL FIELD

This disclosure generally relates to computer graphics.

BACKGROUND

Rendering complex 3D scenes on performance-limited systems (e.g., mobile systems) requires careful optimization and difficult tradeoffs in visual quality and fidelity. Rendering performance can be limited by many factors such as: higher output resolutions, higher framerates, very complex geometry in the scene, complex lighting and visual effects, complex simulations, etc.

On mobile VR systems, scene complexity is a limiting factor that may require reducing fidelity to attain performance budgets. For example, mobile virtual-reality (VR), augmented-reality (AR), or mixed-reality (MR) systems based on phone CPU/GPUs have orders of magnitude less processing power than desktop-based systems and are constrained thermally. These mobile VR/AR/MR systems are very limited in how much geometry they can render at full framerates (e.g., typically 60 fps or 72 fps), yet maintaining full framerate is critical to prevent simulator sickness in virtual reality.

SUMMARY OF PARTICULAR EMBODIMENTS

As previously descried, 3D scenes that are beyond the limits of mobile rendering may nevertheless need to be presented on mobile platforms (e.g., VR/AR/MR). One approach to handling this is to reduce the complexity of the 3D scene through a lossy process called geometry simplification. Embodiments described herein help reduce the negative impact of the lossy simplification by distributing the geometric complexity to high priority areas in the user's view of the virtual scene. Especially in the VR/AR/MR context where the virtual scene is presented to the user via a head-mounted display (HMD), the rendering system could leverage knowledge about the lenses (e.g., Fresnel lenses or other types of concave lenses) used by the HMD and/or eye-tracking sensors to determine which regions of the scene might be less perceptible to the user and perform geometry simplification for virtual objects appearing in those regions.

The rendering techniques described herein improve rendering performance by selectively simplifying the geometry of objects within a virtual scene (such as those rendered by a VR/AR/MR device) with minimal impact on the perceived quality of the scene. For example, the scene to be rendered may include several virtual objects, each defined using a mesh of triangles (or any other type of polygon). Since the process for rendering computer graphics (e.g., according to a rendering pipeline) involves processing the triangles present in a scene (e.g., geometry processing, determining visibility, shading, etc.), the number of triangles in the scene is directly proportional to rendering time and computational power. Thus, to reduce rendering time and power consumption, particular embodiments may selectively simplify scene geometry in a manner that would minimally impact the perceived quality of the rendered image. The manner in which the geometry of an object is simplified may vary. For example, the same object with different levels of detail may be pre-computed and dynamically selected based on rendering needs. As another example, the mesh of a virtual object may be procedurally generated, and the level of decimation used may be determined at rendering time.

Particular embodiments may selectively reduce a scene's geometry complexity based on regions of the scene that are less perceptible to the user. Such regions may be defined based on a combination of foveation due to lens characteristics and/or a user's foveal focus point and the screen coverage of the object to be rendered.

In the VR/AR/MR context, HMDs may have certain known lens characteristics. For instance, HMDs with concave lenses (e.g., Fresnel lenses) may be known to produce a distortion (e.g., a pincushion distortion) that needs to be reversed or corrected by the rendering system. Because of the nature of such lenses, regions of the scene perceived by lens areas that are farther away from the lens center would appear to be more distorted. As such, there is less need for high-quality content in those regions. Thus, lens characteristics may be one factor used for determining the level of geometry simplification that the system could afford.

The level of suitable geometry simplification may also be based on the user's visual-acuity regions. For VR/AR/MR headsets with eye-tracking capabilities, the user's gaze direction and foveal focus point, which corresponds to the region within the user's view with high visual acuity, may be determined and used to determine where to perform geometry simplification. In particular embodiments, the user's foveal focus point may be tracked using computer vision techniques to process images of the user's eyes, which could be captured using the cameras of a VR/AR/MR headset or any computing device. Since a human's visual acuity degrades the farther away it is from the center of his foveal focus point, the quality of content perceived by the user's outer-periphery need not be as high as it is in the center. For example, a VR/AR/MR rendering system may dynamically simplify the geometry of a virtual feature based on the location of the feature relative to the user's foveal focus point. For example, a virtual object may be represented using one-hundred triangles when it is within the user's high visual-acuity region, but the object may be represented using only twenty triangles when the object is in a visual region with lower acuity. The high acuity region and the falloff to the low acuity region may be determined by the particular application given the foveal focus point. For example, one application may define n mutually exclusive and concentric regions around the user's foveal focus point, with each region having progressively lower acuity the farther it is from the foveal focus point. In another example, the level of acuity could be defined on a continuous spectrum, with an inverse relationship between the acuity level and the distance to the foveal focus point (e.g., higher acuity levels correspond to shorter distances from the foveal focus point).

In particular embodiments, screen coverage may additionally be used to determine how much simplification could be made to a virtual object. For example, a screen-coverage threshold (e.g., represented by a number of pixels that would be needed to display the object) may be used to determine the appropriate geometry complexity for an object. For example, if the rendering system determines that a virtual object would have a screen coverage larger than a predetermined threshold (e.g., 50 pixels), then the virtual object may be represented using a finer mesh with more triangles. On the other hand, if the screen coverage of the virtual object is determined to be less than the threshold, then the complexity of the object's geometry may be reduced since the object would appear small and difficult to see. In some embodiments, the screen-coverage thresholds may vary depending on lens characteristics (e.g., distance from the center of the lens for concave lenses) and the user's current foveal focus point as determined by any suitable eye-tracking technique. For example, an application designer may decide that, at the foveal center, the screen-coverage threshold should be small, since only small objects that are difficult to observe can afford to have lesser details in the foveal center without impacting scene quality. The application designer may also decide that, in peripheral regions, the screen-coverage threshold can be larger since larger objects can afford to have simplified geometry in the peripheral regions due to the user's degraded visual acuity in those regions. Ultimately, the particular algorithm for determining the level of suitable geometry simplification could be based on a combination of lens characteristics, the user's current foveal focus point, and/or screen-coverage.

The performance gains from using the rendering techniques described herein are especially pronounced in applications that are vertex-bound. As used herein, the term "vertex-bound" refers to applications (e.g., games, VR/AR/MR applications, etc.) whose rendering performance is more limited by scene complexity (e.g., the number of triangles in the scene) than the number of fragments or pixels needed. For example, if reducing the image resolution or scale of a given scene causes significant performance improvements, the application may be fragment-bound; on the other hand, if the reduction does not significantly affect rendering performance, the application may be vertex-bound (e.g., the main bottleneck is caused by scene complexity).

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein relate to a graphics rendering system configured to selectively simplify the geometry of virtual objects in order to optimize rendering performance with minimal impact on perceived image quality. The embodiments may be particularly suitable for VR/AR/MR application, where computational resources may be limited and the demand for fast rendering may be high. While many of the examples provided may be presented in the VR/AR/MR context, it should be appreciated that the optimization techniques described herein are not limited to VR/AR/MR and could be applied to any computer graphics application.

Figure 1:
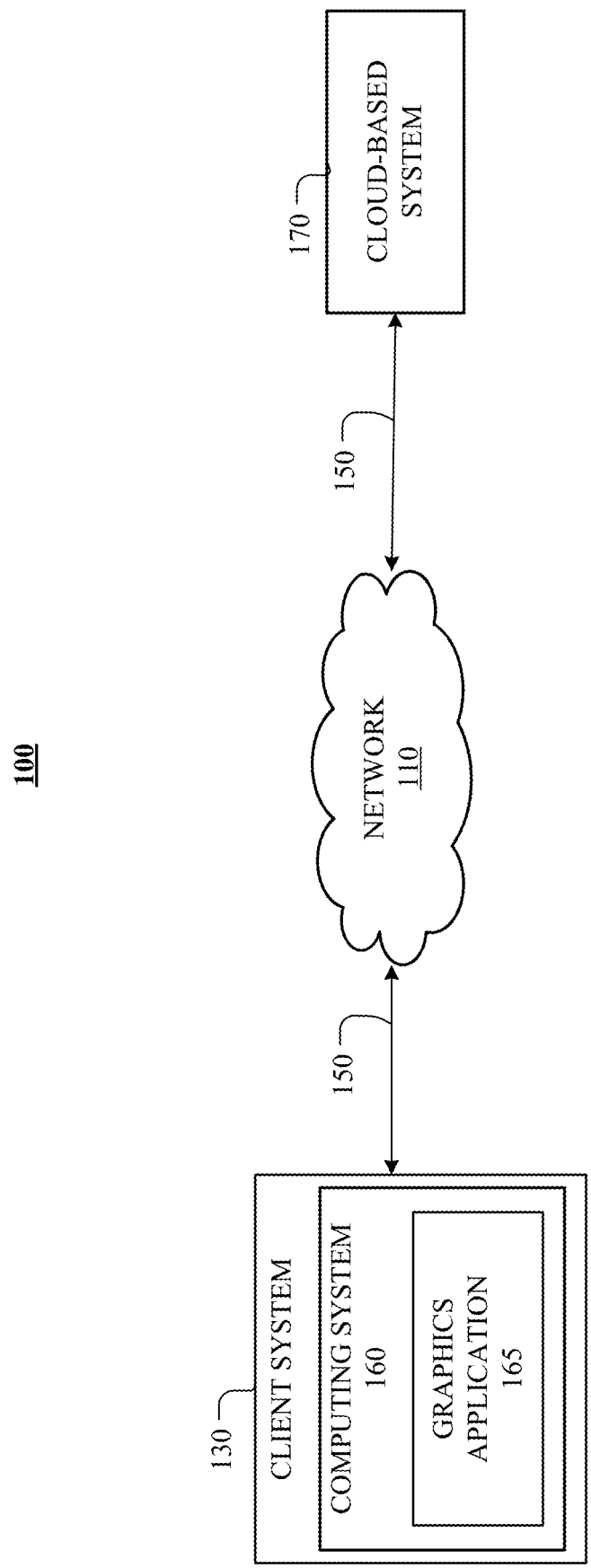
FIG. 1 illustrates an example of an AR/VR/MR computing environment, according to various embodiments.

FIG. 1 illustrates an example computing environment 100, according to various embodiments. The computing environment 100 includes a client system 130 and a cloud-based system 170 (e.g., a server associated with an application 165 running on the client system 130 or a third-party system) connected to each other by a network 110. Although FIG. 1 illustrates a particular arrangement of client system 130, cloud-based system 170, and network 110, this disclosure contemplates any suitable arrangement of client system 130, cloud-based system 170, and network 110. As an example and not by way of limitation, two or more of client system 130, and cloud-based system 170 may be connected to each other directly, bypassing network 110. As another example, client system 130, and cloud-based system 170 may be physically or logically co-located with each other in whole or in part. Moreover, although FIG. 1 illustrates a particular number of client systems 130, cloud-based systems 170, and networks 110, this disclosure contemplates any suitable number of client systems 130, cloud-based systems 170, and networks 110. As an example and not by way of limitation, computing environment 100 may include multiple mobile client systems 130, cloud-based systems 170, and networks 110.

Client system 130 may be any device capable of outputting computer graphics to a user. For example, and not by way of limitation, client system 130 may be a head-mounted display, a virtual reality headset, and so forth. A client system 130 may include some or all of the functionality and components of client system 130, including for example, and not by way of limitation, one or more curved displays, one or more lenses, one or more eye-tracking systems, one or more body-worn devices, one or more headphones, and so forth. In addition, the client system 130 may receive and/or transmit signals with the cloud-based system 170. In particular, the client system 130 may output and/or receive infrared signals, optical signals, radio frequency (RFID) signals, near-field communication signals, and so forth.

Furthermore, client system 130 may include a mobile computing system 160 for rendering computer graphics. In particular, the mobile computing system 160 may include one or more processing units (e.g., a CPU, a GPU, etc.). The mobile computing system 160 may generate, store, receive, and/or send data related to computer graphics, including, for example, and not by way of limitation, visual data, audio data, tactile data, and so forth. In particular embodiments, a mobile CPU may process user input received via the client system 130 and/or the cloud-based system 170, define/modify mesh geometries, and output the mesh geometries to a mobile GPU for rendering. The mobile GPU may implement a graphics pipeline for processing vertices defining mesh geometries received from the CPU. For example, the GPU may include one or more shaders that assemble vertices into polygons, rasterize mesh geometries, pixelate mesh geometries into pixel candidates, remove occluded surfaces from pixel candidate, output pixels for display, and so forth.

In various embodiments, the graphics application 165 may have certain quality, performance, or resource limitations. For example, in various embodiments, the graphics application 165 may be configured to satisfy one or more rendering performance guidelines. For example, rendering performance guidelines may include not skipping frames and/or not generating rendering artifacts (e.g., tearing). In addition, the client system 130 may be energy constrained. For example, and not by way of limitation, the power supply of the client system 130 may be provided by a battery. Due to any of these limitations, the graphics application 165 may control the mesh geometries so that only a limited number of triangles are rendered per frame.

In particular embodiments, the computer graphics produced by and/or designed for the computing environment 100 may exceed the rendering capabilities and rendering requirements of the client system 130. For example, certain vertex-bound graphics application 165 may be configured to display VR/AR/MR illustrations. These types of illustrations may have 3D representations (e.g., mesh geometries) that are arbitrarily dense. Consequently, the client system 130 may be asked to process many more triangles per frame than it is able to within the rendering performance guidelines (e.g., time, quality, or power-consumption constraints), resulting in frame skips or other undesirable artifacts.

To address the aforementioned rendering issues due to complex scenes with dense geometries, particular embodiments provide a computer graphics environment that is configured to selectively simplify the geometries of a scene without sacrificing perceived quality. The computer-generated images may be the frames of an animation, a virtual scene, a mixed-reality environment, and so forth. In particular embodiments, the images may be rendered based on a multi-dimensional mesh geometry (e.g., a three-dimensional mesh geometry). As will be described in further detail, the multi-dimensional mesh geometry may be generated from a control point representation and/or a subdivision surface representation. Simplifying an object's mesh geometry may mean a reduction in the number of triangles or polygons used to define the mesh. For example, instead of representing an object using one hundred triangles, ten triangles may be used. As previously described, reducing the number of triangles could significantly reduce computational costs. However, representing an object with fewer triangles also means that the object would have degraded level of image detail and, therefore, may not always be suitable or desirable. Thus, particular embodiments selectively determine which objects or portions thereof can be represented with simplified geometry without negatively impacting the perceived quality of the rendered image.

Figure 2B:
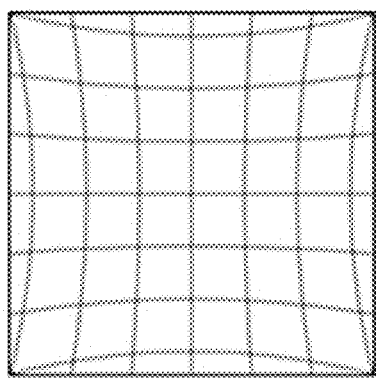
FIGS. 2A-2C illustrate an example display configuration of a mobile client system and observed distortion effects.
Figure 2C:
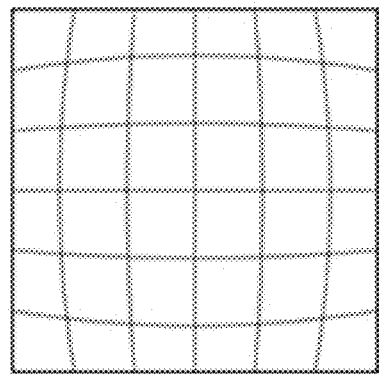
Figure 2A:
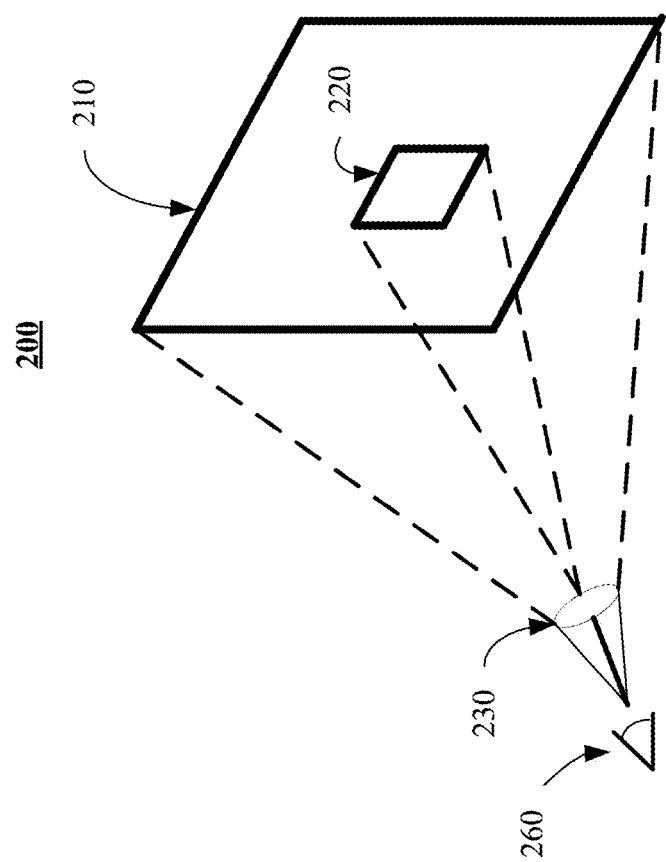

To dynamically determine the suitable level of geometry simplification, particular embodiments take into consideration foveation associated with known distortion characteristics of the lens and/or the varying acuity of human vision and screen coverages of the objects to be rendered. FIGS. 2A-2C help illustrate foveation effects due to lens characteristics. FIG. 2A illustrates an example display configuration of a mobile client system 200 (e.g., a VR/AR/MR HMD), according to various embodiments. In particular, the display configuration 200 includes, for example and not by way of limitation, a display 210, a screen region 220, a lens 230, and an eye of the viewer 260. A similar display configuration may be present in the HMD for the viewer's other eye. The lens 230 may be a Fresnel lens, convex lens, planar-convex lens, or other types of lens configured to expand the field of view of the viewer. One characteristic of such a lens 230 is that the distortion observed through regions closer to the lens center would be less than the distortion observed through regions farther away. For example, the screen region 220, when observed by the eye 260 through the lens 230, would undergo less distortion than regions outside of the screen region 220. FIG. 2B illustrates the pincushion distortion effect of a uniform grid as seen through the lens 230. As shown, the grid pattern near the edges is distorted more severely than the pattern closer to the center. To counteract the pincushion distortion effect, a rendering system may render (e.g., via post-processing) an image using an equal and opposite barrel distortion, as illustrated in FIG. 2C. As such, when a user sees content through areas of the lens 230 that are distant from its center, the content has undergone both barrel distortion (performed by the rendering system) and pincushion distortion (due to the lens). Consequently, even if the rendering quality of the content is suboptimal (e.g., due to geometry simplification), the user likely would not perceive significant differences from what would otherwise be perceived had the rendering quality been optimal.

Figure 3:
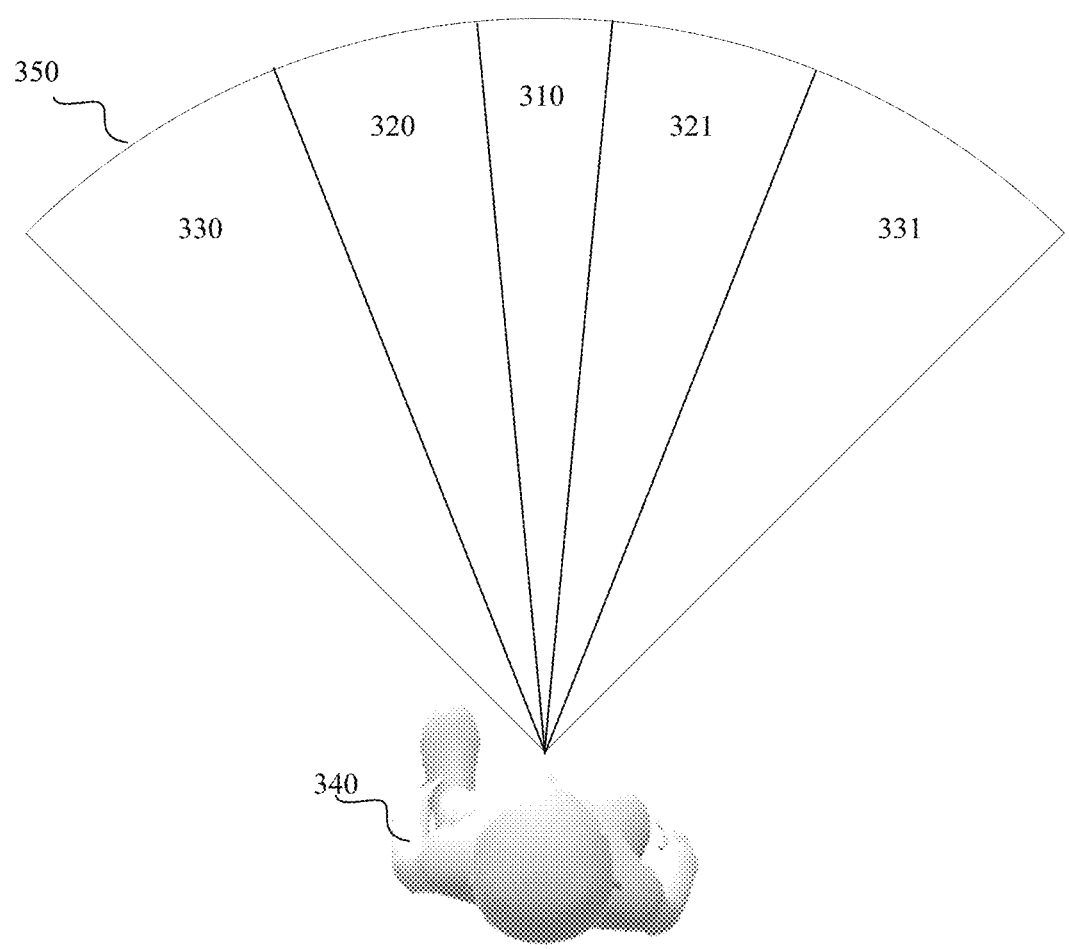
FIG. 3 provides a simplified diagram showing the discrepancy of a person's visual acuity over his field of view.

In embodiments where the user's gaze can be tracked using eye-tracking techniques (e.g., using computer vision techniques to process images captured by cameras mounted within an HMD), the user's visual acuity could also be taken into consideration when determining the suitable simplification level of virtual objects. FIG. 3 provides a simplified diagram showing the discrepancy of a person's 340 visual acuities over his field of view 350. In this diagram, the center region 310 represents the person's 340 foveal focus point. The visual acuity of the person 340 decays the farther away it is from the foveal focus point 310. For example, the person's 340 visual acuity in the neighboring regions 320 and 321 is less than that of the foveal focus point 310, and the visual acuity in regions 330 and 331 is worse still.

Observing that the acuity of the human visual system rapidly decays towards his/her peripheral vision, embodiments described herein are designed to simplify the mesh geometry of objects depending on where the object is located relative to the user's foveal focus point. For example, if the object is within the user's foveal focus point, then the object may be represented using its default level of detail. As the object move towards the user's periphery, the object may be represented using progressively fewer geometry since the object will not be in sharp focus anyway. In doing so, the techniques described herein may significantly improve rendering performance.

Figure 4:
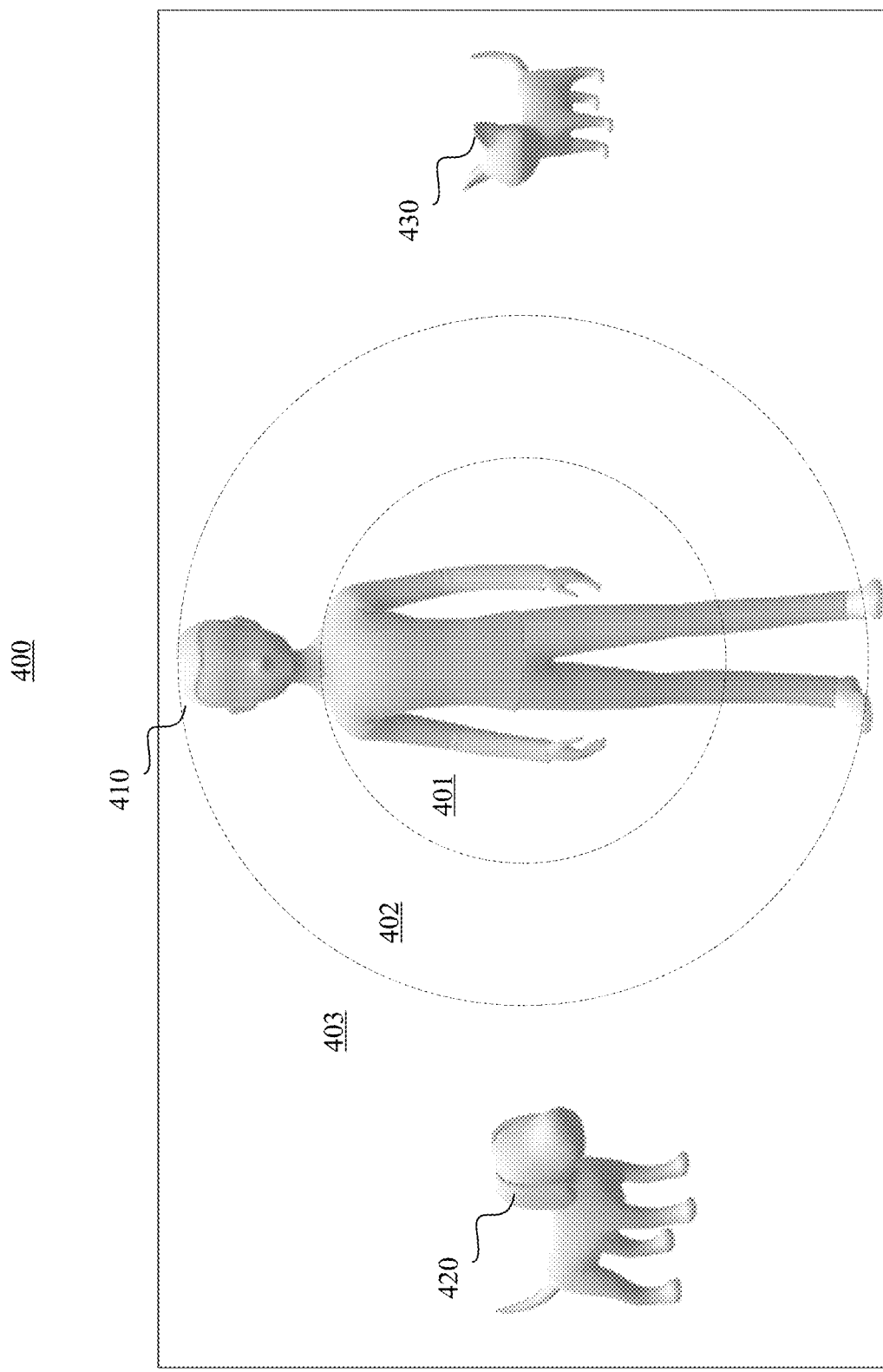
FIG. 4 illustrates a concept of foveated rendering, according to particular embodiments.

FIG. 4 illustrates a concept of foveated rendering, according to particular embodiments. FIG. 4 illustrates a scene 400 that is captured from or to be rendered for a particular viewpoint. The scene 400 contains a person 410 in the center of the viewpoint, a dog 420 to the left of the viewpoint, and a cat 430 to the right of the viewpoint. The dotted concentric circles are used to visually delineate the viewer's visual acuity. The region 401 within the smallest circle represents the foveal focus point of the viewer; the region 402 between the two circles represents a portion of the viewer's view that is farther from the foveal focus point; and the region 403 outside of the larger circle represents a portion of the viewer's view that is even farther from the foveal focus point. The regions 401-403, in particular embodiments, may change depending on where the user is looking. For example, if the user is directly looking at the dog 420, the regions 401-403 would be centered around the dog 420 instead of the person.

In particular embodiments, an object's position relative to the user's foveal focus point may determine the level of detail that is appropriate for representing the object. For example, since the person's 410 torso is within the foveal focus point 401, the level of the detail of the mesh geometry used to represent the person's 410 torso. Since the person's 410 head and lower legs are in the second-farthest region 402 from the center of the foveal focus point 401, they may be represented using more simplified mesh geometry. The dog 420 and cat 430 may be represented with even more simplified mesh geometry since they are in the farthest region 403.

The level of geometry simplification for objects in the scene may also depend on where they are located relative to the lens. For example, if the scene shown in FIG. 4 is centered with respect to a Fresnel or convex lens, then the person's torso would experience less distortion than the dog 420 and the cat 430, which would be observed through the outer edges of the lens.

In particular embodiments, the screen coverage size of the object may be additionally used with either or both the approaches described above (i.e., foveal focus point or lens characteristics) to determine the geometry simplification level of the object. For example, in FIG. 4, the screen coverage of the dog 420 is greater than the screen coverage of the cat 430 since more pixels would be needed to display the dog 420. However, if the dog 420 were to walk farther away from the camera or viewer, then the dog 420 will appear smaller and would need fewer pixels on the screen. In particular embodiments, the rendering system may set a threshold screen pixel size. If the dog 420 continues to walk farther away and eventually has a screen-coverage size that is less than the threshold, the rendering system may selectively reduce the mesh geometry of the dog 420 since any degradation in the level of detail would not be observable given how small the dog 420 would appear.

In particular embodiments, the screen-cover threshold that triggers geometry simplification may depend on how far the corresponding screen is from the foveal focus point and/or the center of the lens. For example, the screen-cover threshold in region 401 may be smaller (or even non-existent) than the screen-cover threshold in regions 402 and 403, because the region 401 is being observed through the lens center or where the user's visual acuity is at its highest. Thus, an object appearing within region 401 would need to be very small in order for it to qualify for geometry simplification. The screen-coverage threshold in region 402 may be relatively larger, since region 402 is farther away from the lens center and/or the user's visual acuity there is relatively worse compared to what it is in region 401. Thus, even if the object appears larger in region 402, its geometry may nevertheless be simplified. In a similar manner, the screen-coverage threshold in region 403 may be the largest or non-existent (i.e., all objects within region 403 may be simplified, regardless of screen coverage) since any object appearing within the peripheral region 403 would appear blurry (due to being in the user's peripheral vision) or distorted (due to the characteristics of the lens). As such, the decrease in the level of detail of the object would be difficult to notice.

The varying visual acuity of the user may be leveraged to improve rendering performance. In various embodiments, to improve rendering performance, a VR/AR/MR application may selectively simplify the geometry of the scene to be rendered. For example, the VR/AR/MR application could use fewer triangles to model objects in the scene. Simplifying the geometry of the entire scene, however, may not be desirable, since objects that can be acutely perceived (e.g., objects that would appear close to the foveal focus point) would have noticeably less detail or quality due to its simplified geometry. To maintain the user-perceived display quality of the frame, the VR/AR/MR application may perform mesh simplification based on the objects' location relative the foveal focus point and/or the object's screen pixel coverage. Since the user's visual acuity degrades in the periphery, simplifying the geometry of objects that would appear in the user's peripheral vision would not noticeably degrade the quality of the scene as perceived by the user.

Figure 5:
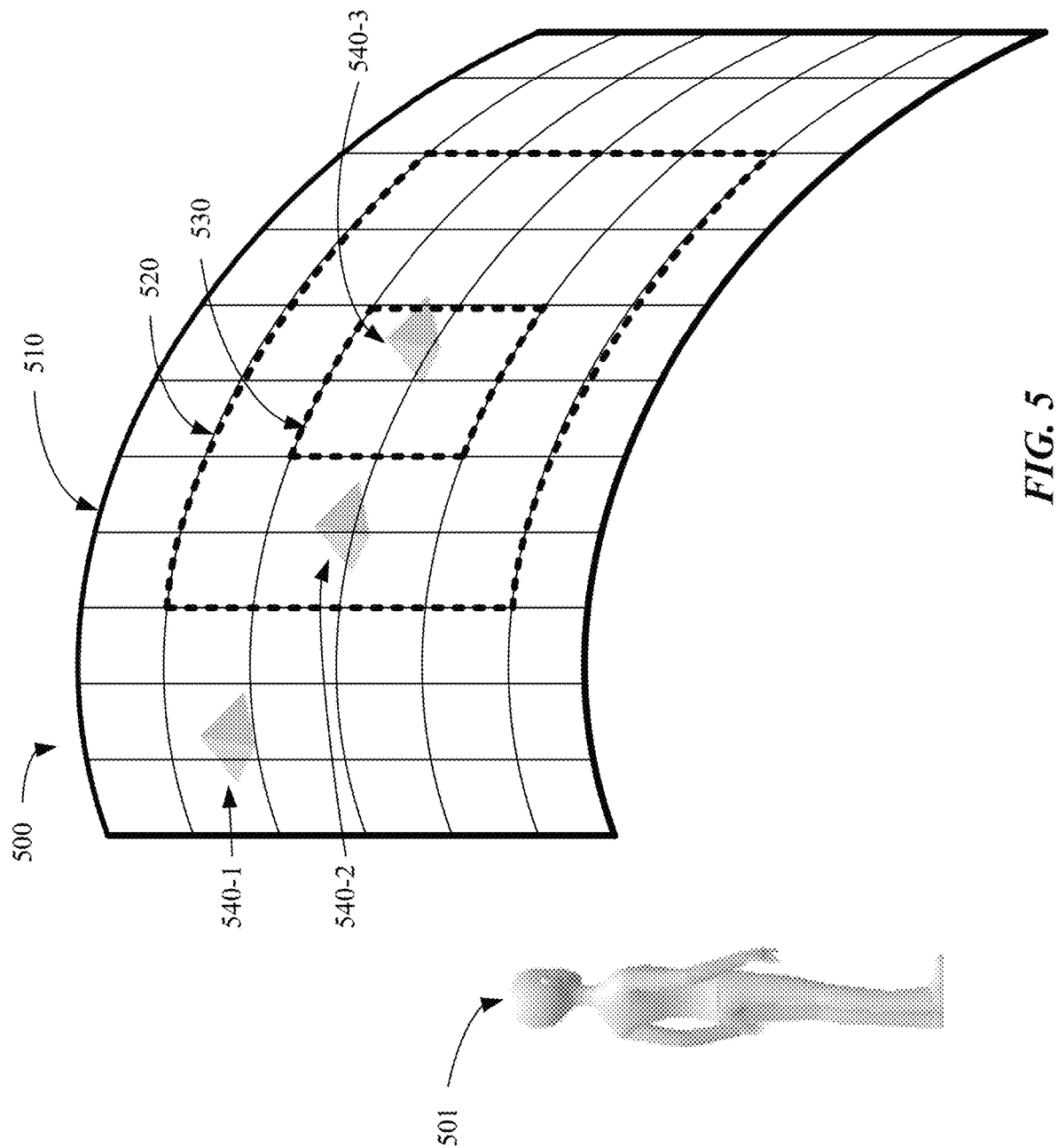
FIG. 5 illustrates an example where objects within a scene undergo different levels of geometry simplification based on their relative location in the display, according to particular embodiments.

FIG. 5 illustrates an example of a user 501 perceiving virtual objects (e.g., 540-1, 540-2, and 540-3) within a scene 500 displayed through a VR/AR/MR HMD. The outer boundary 510 of the scene 500 represents the edges of what is presented on the HMD's screen. The middle boundary 520 and inner boundary 530 are illustrated for discussion purposes only, and their centers are perceived by the user 501 through the center of a lens of the HMD (not shown). When objects in the rendered scene are displayed, they may be located within different regions of the screen, depending on the view orientation of the user 501. In FIG. 5, object 540-1 appears outside of the middle boundary 520; object 540-2 appears between the middle 520 and inner 530 boundaries; and object 540-3 appears inside the inner boundary 530. While this example shows the screen or displayed scene 500 being divided into three discrete areas, this disclosure contemplates the screen or scene 500 being divided into any number of discrete areas (e.g., 1-100 areas). While the discrete areas shown are defined by concentric borders around the center of the lens or displayed scene 510, the discrete areas could be defined in any manner (e.g., it may be divided into a checker-board pattern of areas). Moreover, the division of the areas may not be discrete, but continuous. For example, the level of geometric simplification may be defined on a continuous spectrum, so that objects located farther away from the lens center or foveal focus point of the user may be simplified more (e.g., objects that are farther away from the lens center or foveal focus point may be modeled using fewer triangles).

The foveal focus point of the user 501 may change dynamically depending on the user's eye gaze, which could be tracked using any suitable eye-tracking techniques. The user's visual acuity within its field-of-view (FOV) is at its best within the user's foveal focus point (or center of the field-of-view) and gets progressively worse for FOV regions that are farther away from the foveal focus point. The user's 501 foveal focus point may or may not coincide with the center of the lens, since foveal focus point depends on the user's eye gaze (measured by an eye tracker) and the lens center depends on the orientation or pose of the user's HMD. Using FIG. 5 as an example, the screen (represented by the outer boundary 510) is centered with respect to the HMD lenses, but the user's 501 eyes may be looking at any part of the screen and therefore the user's foveal focus point may not coincide with the lens center. For example, the user, without changing his head position, may look directly at any of the three virtual objects by moving his eyes. When the user's 501 eyes are fixated on object 540-1, the user's foveal focus point will be centered on that object 540-1.

In particular embodiments, an eye-tracking system may be used to dynamically determine the foveal focus point of the user. For example, a VR/AR/MR headset may be integrated with an eye-tracking system that monitors the user's eye movement. In particular embodiments, the eye-tracking system may include an illumination system that outputs infrared light towards one or more eyes of the user. In addition, the eye-tracking system may include an eye-tracking camera that detects reflected infrared light from the one or more eyes of the user. The eye-tracking system may compute a position of one or more glare spots on the eye(s) of the user based on the transmitted infrared light and the detected reflections. The eye-tracking system may further compare the positions of the glare spots to a model of an eye to determine an orientation of the eye(s). Based on the orientation of the eye(s), the eye-tracking system may determine an updated direction-of-gaze of the user. The eye-tracking system may further transmit the updated direction-of-gaze of the user to the VR/AR/MR application. Based on the updated direction-of-gaze of the user, the VR/AR/MR application may determine an updated field-of-view of the user. Additionally or alternatively, the VR/AR/MR application may determine an updated foveal focus point of the user based on the updated direction-of-gaze of the user and/or the updated field-of-view of the user. For example, the VR/AR/MR application may calculate a projection of the direction-of-gaze and/or the field-of-view that intersects a display, taking into account the known parameters of the display and/or lens, and dynamically compute the foveal focus point where the user's visual acuity is the strongest. As such, the position of the foveal focus point may vary with respect to the display. For example, the foveal focus point may move up, move down, move to the left, move to the right, rotate, and so forth. In addition, as the direction-of-gaze of the user changes in time, the VR/AR/MR application may continuously determine the user's foveal focus point. Additionally, or alternatively, the VR/AR/MR application may continuously identify one or more pixels or areas of the display that correspond to the computed foveal focus point of the user. Accordingly, the VR/AR/MR application may dynamically determine a position of the foveal focus point relative to the position of the display of the client system.

In particular embodiments, each time the VR/AR/MR application updates the foveal focus point, the VR/AR/MR application may also compute the acceptable level of geometry simplification for different areas of the display. In particular embodiments, the different areas may be defined by radial perceptivity boundaries centered around the user's eye gaze. Using FIG. 5 as an example, if the gaze of the user 501 is directed towards object 540-3, the VR/AR/MR application may tessellate the geometric representation of object 540-3 using more triangles to capture more surface details and use fewer triangles for object 540-2 to reduce computational expenses. Similarly, since object 540-1 is even farther away from the user's foveal focus point, it could be represented using even fewer triangles. For example, for each frame rendered, the rendering system may determine where each virtual object is going to appear relative to the screen. The rendering system may use localization techniques to determine the pose of the user's HMD relative to the virtual scene to determine what view to render. This, in turn, allows the system to know where virtual objects would appear relative to the screen. For example, in FIG. 5, object 540-3 is located within the inner boundary 530 where there is the least amount of distortion; object 540-2 is located in the middle area between boundaries 520 and 530 where there is more distortion; and object 540-1 is located outside of boundary 520 where there is the most distortion. To optimize rendering performance, the VR/AR/MR application may use progressively fewer polygons or triangles to represent the geometry of objects that are farther away from the center of the lens. In the example shown, even though objects 540-1, 540-2, and 540-3 are all the same, the number of triangles used to represent object 540-1 may be fewer than those used to represent object 540-2, and the number of triangles of object 540-2 may be fewer still than those of object 540-3.

In particular embodiments, the level of acceptable geometry simplification may additionally be based on screen pixel coverage. An object's screen pixel coverage may be measured by the number of pixels (in one dimension, such as length, width, or diagonal, or two dimensions, such as its area) that are needed to display the object. For example, a smaller object would need fewer pixels; a larger object would need more pixels. An object's screen pixel coverage could vary depending on its distance from the camera or viewer (e.g., an object would appear smaller if it is farther away from the camera or viewer). In particular embodiments, when a VR/AR/MR application determines that an object's screen pixel coverage will be sufficiently small when it is displayed, the VR/AR/MR application may simplify the geometry of the object to reduce computational needs. Simplifying the geometry of such an object would not significantly impact the perceived detail and quality of the object since the object would appear small and the pixel resolution for the object would be low anyway. In particular embodiments, the VR/AR/MR application may use one or more threshold screen coverage sizes to trigger different levels of geometry simplification. The threshold may be any number of pixels (e.g., 10 pixels, 16 pixels, 45 pixels, and so forth) or other measures of screen coverage (e.g., the percentage of the screen, such as 2 percent of the screen, 4 percent, 10 percent, etc.). When rendering, the VR/AR/MR application may estimate an object's pixel screen coverage and compare it against the one or more thresholds. If the object's screen coverage exceeds the threshold(s), then no geometry simplification would be performed and the default or a higher geometry resolution would be used to represent the object. If the object is smaller than a threshold, then the VR/AR/MR application may perform a corresponding level of geometry simplification for that object. For example, if an object's screen coverage is less than a threshold of 30 pixels, the object may be represented using 20 triangles; if the object moves farther away and its screen coverage is less than a threshold of 20 pixels, the object may be represented using 10 triangles instead.

In various embodiments, the VR/AR/MR application may use the user's foveal focus point and/or lens characteristics that cause distortion (e.g., distance from the lens center) in conjunction with screen pixel coverage to determine the appropriate level of geometry simplification. For example, each pixel may be associated with an area defined relative to the foveal focus point and/or lens center, and each area may have a corresponding screen coverage threshold that would trigger a certain level of geometry simplification. In operation, the VR/AR/MR application may determine a variable screen coverage threshold for an object depending on where the object appears relative to the user's foveal focus point and/or lens center. For example, the size of the variable threshold may be determined based on the distance between the object and the foveal focus point and/or lens center. For example, referring again to FIG. 5, the VR/AR/MR application may set a smaller threshold (e.g., 5 pixels) for objects in the foveal focus point and/or near the center of the lens (i.e., within border 530) because, given the high visual acuity in the foveal focus point or the minimal distortion in the area, only objects that are very small (as defined by the small screen coverage threshold) could afford to be simplified without negatively impact the perceived quality of the rendered object. In contrast, the application may set a larger screen coverage threshold for objects in the middle area (i.e., between borders 520 and 530) since the lessened visual acuity in the middle area could allow larger objects to be simplified without negatively impacting the perceived image quality of the rendered object. Thus, if objects 540-2 and 540-3 have the same screen coverage, object 540-2 may undergo geometry simplification, whereas object 540-3 may not undergo geometry simplification since the screen coverage threshold in the region around the foveal focus point is more difficult to satisfy (e.g., conceptually, this means that objects in the user's foveal focus point will not undergo geometry simplification unless it is very small and difficult to see).

The manner in which the geometry of a 3D object is simplified may vary depending on how the 3D object is defined. In particular embodiments, the geometry of a 3D object may be procedurally defined (e.g., using subdivision surfaces or control-point based curve definitions). For example, the general shape of the object may be generally defined and stored, but the exact configuration of triangles or mesh used to model the 3D object for rendering may be not be determined until rendering time. Such procedurally-defined objects that are dynamically generated at runtime have the advantage of being able to adapt to runtime requirements. Thus, depending on where the object would appear relative to the user's foveal focus point, the lens center, and/or the object's screen coverage size, the geometric resolution (e.g., number of vertices or triangles used in the mesh) of the object could be dynamically adjusted. In other embodiments, an object may have multiple predefined geometries with varying levels of simplification. For example, an application designer may create one version of an object with n-number of triangles and another version of the same object with m-number of triangles, where n>m. When the object is in a region with high visual acuity, the object with n-number of triangles may be used; when the object is in a region with lower visual acuity, the object with m-number of triangles may be used instead to reduce computational costs and power consumption.

Figure 6C:
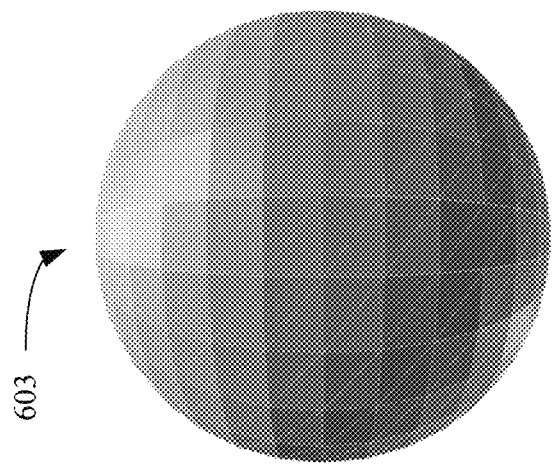
FIGS. 6A-C illustrate different levels of geometry simplifications used to represent a sphere, according to various embodiments.
Figure 6B:
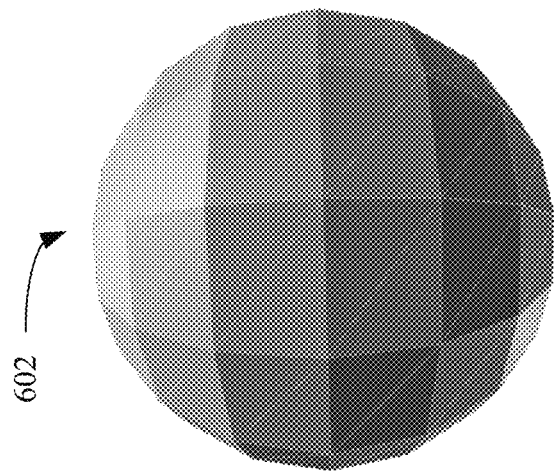
Figure 6A:
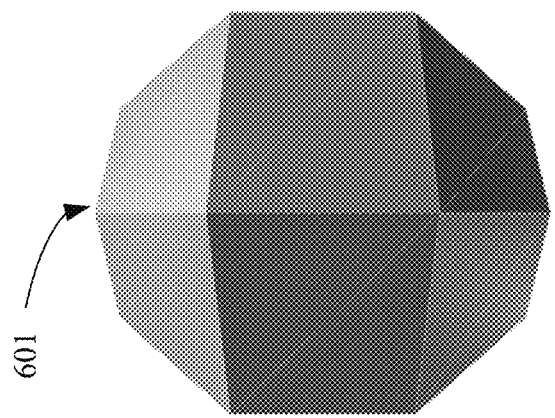

FIGS. 6A, 6B, and 6C illustrate different levels of tessellation for a sphere. FIG. 6A illustrates a sphere 601 with relatively fewer triangles than the spheres 602 and 603 shown in FIGS. 6B and 6C, respectively. These different versions of the sphere may be dynamically generated. For example, at run time, depending on the level of geometry simplification desired (e.g., based on a combination of the object's location relative to the screen, foveal focus point of the user, and screen coverage size), the sphere with the desired geometric resolution may be generated on-the-fly. When higher geometric detail is desired (e.g., when an object is in a high visual-acuity region), the number of tessellation triangles may be increased (e.g., sphere 603). Conversely, when lower geometric detail is desired in exchange for improved rendering performance, fewer tessellation triangles (e.g., sphere 601) may be generated (e.g., when an object is in a relatively lower visual-acuity region).

Figure 7:
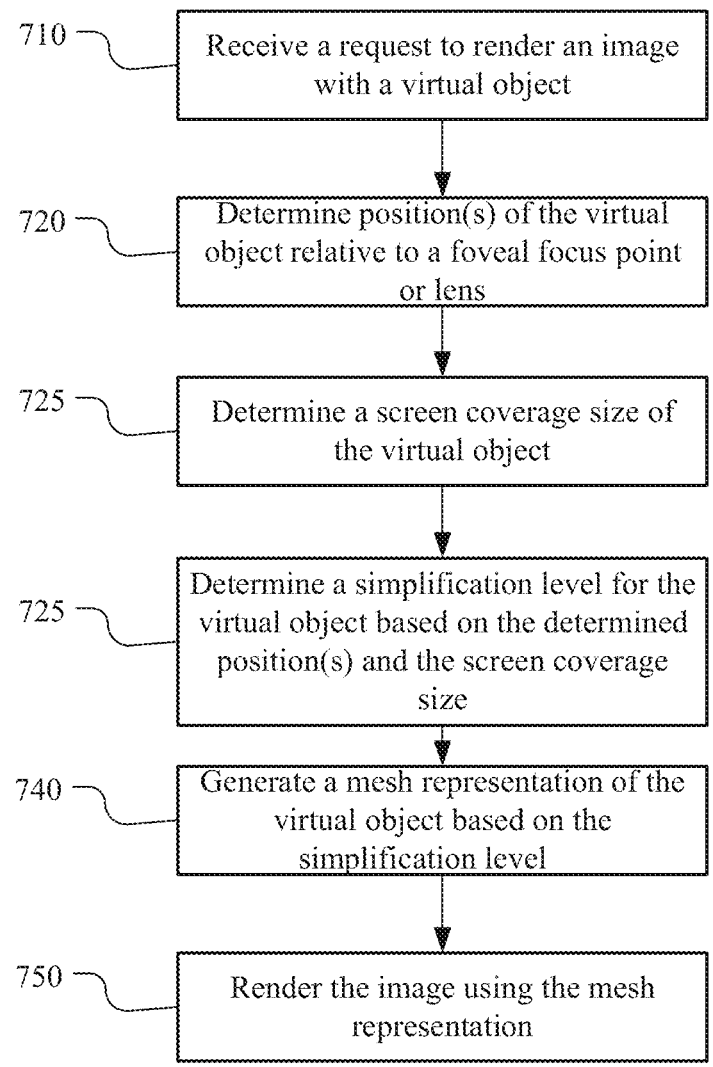
FIG. 7 illustrates an example method for performing mesh simplification, according to various embodiments.

FIG. 7 illustrates an example method 700 for performing mesh simplification, according to various embodiments. The method 700 may begin at step 710, where a computing system may receive a request to render an image of a virtual scene from a viewpoint. For example, a VR/AR/MR application may allow a user to move around and see a 3D virtual environment from different viewpoints. As the user navigates through the 3D virtual environment, the VR/AR/MR application may continuously render frames of the environment from the user's current viewpoint. Each frame of the virtual scene may include any number of virtual objects (e.g., a virtual pet) that are visible from the user's viewpoint.

At step 720, the system may determine one or more positions of the virtual object relative to one or more of (1) a foveal focus point associated with the viewpoint and/or (2) a lens used for viewing the requested image, respectively. For example, based on the user's current viewpoint, the VR/AR/MR application may determine which virtual objects in the 3D environment are visible from the user's viewpoint. In embodiments where eye-tracking data is available, then for each visible virtual object, the application may determine its position relative to the user's foveal focus point. Alternatively, the determined position of the virtual object may be relative to a lens used for viewing the requested image. For example, a VR/AR/MR headset may have two lenses through which the user may look through to see the displayed images. The virtual object's relative position to each lens determines how much distortion could be expected. In particular embodiments, the object's position(s) relative to the user's foveal focus point and/or lens may be used to compute the object's distance from the foveal focus point and/or center of the lens, respectively.

At step 725, the system may determine a screen coverage size of the virtual object. The screen coverage size of the virtual object may be based on the known dimensions of the virtual object and its distance from the user's viewpoint. Using geometry, the rendering system could compute the screen coverage size of the virtual object as it is projected onto the image plane.

At step 730, the system may determine a simplification level for the virtual object based on (1) the determined one or more positions of the virtual object relative to the foveal focus point and/or the lens (e.g., the object's distances from the foveal focus point and/or lens center), and (2) the determined screen coverage size of the virtual object. As described in more detail elsewhere herein, the suitable simplification level for the virtual object may depend on a combination of the object's location relative to the user's foveal focus point and/or the lens center and the screen coverage size of the object. For example, the system may determine a region of the image in which the virtual object would appear, and any virtual object appearing in that region would be assigned a simplification level associated with the region. For example, the screen may have a plurality of regions (e.g., as shown in FIG. 5), each being associated with a predetermined simplification level based on a proximity of the region to the foveal focus point or lens center. In particular embodiments, the system may also determine a screen coverage size of the virtual object based on the viewpoint from which it is observed. For example, the virtual object may appear larger (thus requiring a higher screen coverage size) when it is closer to the viewpoint and smaller (thus requiring a smaller screen coverage size) when it is farther from the viewpoint. The screen coverage size of the virtual object may be compared to a screen coverage threshold associated with the region in which the object appears. For example, the system may determine a region of the image in which the object would appear. That region may have an associated screen coverage threshold. For example, the threshold for a region that corresponds to the foveal focus point or lens center may be small, so that only objects that appear very small in the foveal focus point or lens center would undergo geometry simplification. Conversely, the threshold for a region in the periphery or outer edges of the image may be large, so that even large objects would undergo geometry simplification when they appear in the periphery. Based on the determined screen coverage threshold associated with the region in which the object would appear, the system may determine an appropriate simplification level for the virtual object by comparing the screen coverage size of the virtual object and the determined screen coverage threshold.

In embodiments where the simplification level is based on both the object's position relative to the foveal focus point and the object's position relative to the lens center, the rendering system may apply rules or criteria to account for both conditions and determine the suitable geometry simplification level under the circumstances. For example, the system may determine one simplification level based only on the object's position relative to the user's foveal focus point and another simplification level based only on the object's position relative to the lens center, and then take the average of the two simplification levels to determine the final simplification level to use. In another embodiment, the two simplification levels may be weighted before the average is taken (e.g., the simplification level computed based on the user's foveal focus point may be weighted more heavily than the simplification level computed based on the lens center, or vice versa).

The simplification level represents a degree of simplification that is to be applied to the geometry of the virtual object. For example, if the virtual object is outside of the user's foveal focus point (e.g., in the periphery) or lens center, the selected simplification level may cause the geometry of the object to be simplified. On the other hand, if the virtual object is within the user's foveal focus point or lens center, then the simplification level selected may not cause the geometry of the object to be simplified. The particular implementation of the simplification level may depend on the manner in which the geometry of virtual objects is simplified. For example, the simplification level may indicate the number of triangles that are to be generated for each control point or a number of subdivisions that is to be applied to each subdivision surface of the object. The simplification level may alternatively correspond to, e.g., a high level of simplification, a medium level of simplification, a low level of simplification, or no simplification, and the procedurally-defined objects may use the determined simplification level to determine how many polygons to generate for the object.

At step 740, the system may generate a mesh representation of the virtual object based on the determined simplification level, where the number of polygons used in the mesh representation depends on the determined simplification level. For example, the general shape of the virtual object may be predefined using any suitable technique, such as control points or subdivision surfaces, but the actual 3D mesh representation of the virtual object used for rendering the desired image may be dynamically generated based on the determined simplification level. At rendering time, the system may access from memory the shape definition of the virtual object (e.g., represented using subdivision surfaces or control points) and apply the appropriate algorithm to generate the corresponding mesh representation of the virtual object. As previously described, the number of polygons used in the mesh representation may be lower when the virtual object is farther from the foveal focus point and/or lens center and higher when the virtual object is closer to the foveal focus point and/or lens center.

With respect to the subdivision surface representation, if the virtual object is within a region close to the foveal focus point and/or lens center, then the VR/AR/MR application may instruct the computing system to subdivide the subdivision surface to a maximum subdivision refinement level associated with the subdivision surface (e.g., 50 iterations of a subdivision algorithm). In particular, a subdivision algorithm may iterate a fixed number of times to add one or more vertices and/or one or more edges to the region. For example, a geometry shader may execute a Catmull-Clark subdivision algorithm to add vertices and edges to a portion of the subdivision surface that lies within the high visual-acuity area near the foveal focus point. Additionally, or alternatively, if the portion of the subdivision surface is located outside of the foveal focus point and/or lens center, then the VR/AR/MR application may limit subdivision refinement level based on the determined simplification level. For example, and not by way of limitation, the VR/AR/MR application may limit a number of times that the geometry shader applies a subdivision algorithm (e.g., a limit of 5 iterations of the subdivision algorithm) to a portion of the subdivision surface that lies outside of the high visual-acuity area.

In particular embodiments, the VR/AR/MR application may configure the geometry shader to remove or add mesh elements to a virtual object frame-by-frame, depending on the simplification level assigned to the object for each frame (or each predetermined number of frames). For example, the VR/AR/MR application may apply a subdivision algorithm to a subdivision surface to increase the number of polygons in the mesh or apply the subdivision algorithm in reverse to simplify or reduce the number of polygons in the mesh. In particular embodiments, the same mesh representation may be adjusted frame-by-frame. For example, the VR/AR/MR application may remove one or more vertices and/or one or more edges from the mesh based on the dynamically-assigned simplification level. Additionally, or alternatively, the VR/AR/MR application may re-generate the mesh geometry for each frame based on the assigned simplification level. By being able to dynamically adjust the mesh geometry of virtual objects, the VR/AR/MR application may optimize rendering performance each time a virtual object enters or exists a high visual-acuity area near the foveal focus point. For example, the VR/AR/MR application may generate the object using an increased the number of mesh elements when the object enters or gets closer to the foveal focus point and/or lens center. Alternatively, the VR/AR/MR application may generate the feature using a reduced number of mesh elements when the object exists or gets farther from the foveal focus point and/or lens center. Accordingly, by implementing foveated rendering, the VR/AR/MR application may reduce an amount of geometry in a frame to improve rendering performance, without reducing the user-perceived quality of a frame.

At step 750, the system may render the image of the virtual scene using at least the generated mesh representation of the virtual object. Different virtual objects in the scene may be associated with different simplification levels, using the process described above. For example, virtual objects that are farther from the foveal focus point and/or lens center may be assigned simplification levels that would cause more mesh simplification than the simplification level assigned to virtual objects closer to the foveal focus point or lens center (e.g., virtual objects in the foveal focus point may not undergo mesh simplification and virtual objects outside of the foveal focus point may undergo mesh simplification). In particular embodiments, each virtual object may form a part of a larger semantically-defined object (e.g., multiple splines, which may be the primitive virtual objects used in a drawing application, may collectively be used to form a virtual tree in the virtual scene). Thus, different portions of a semantically-defined object may undergo non-uniform simplification levels (e.g., some of the splines of the virtual tree that are in the foveal focus point may not undergo simplification, whereas other splines of the virtual tree that are outside of the foveal focus point may undergo simplification). Once the mesh representation with the appropriate level of geometry simplification has been generated for each object in the visible scene, the system may proceed with the rendering pipeline. For example, based on the mesh representations of the objects in the scene, the system may project the mesh, compute lighting, apply clipping, and rasterize the results. The rasterized fragments may then be colored using a fragment shader. The end result of the pipeline is a rendered 2D image or frame of the 3D virtual scene.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for performing mesh simplification including the particular steps of the method of FIG. 7, this disclosure contemplates any suitable method for performing mesh simplification including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
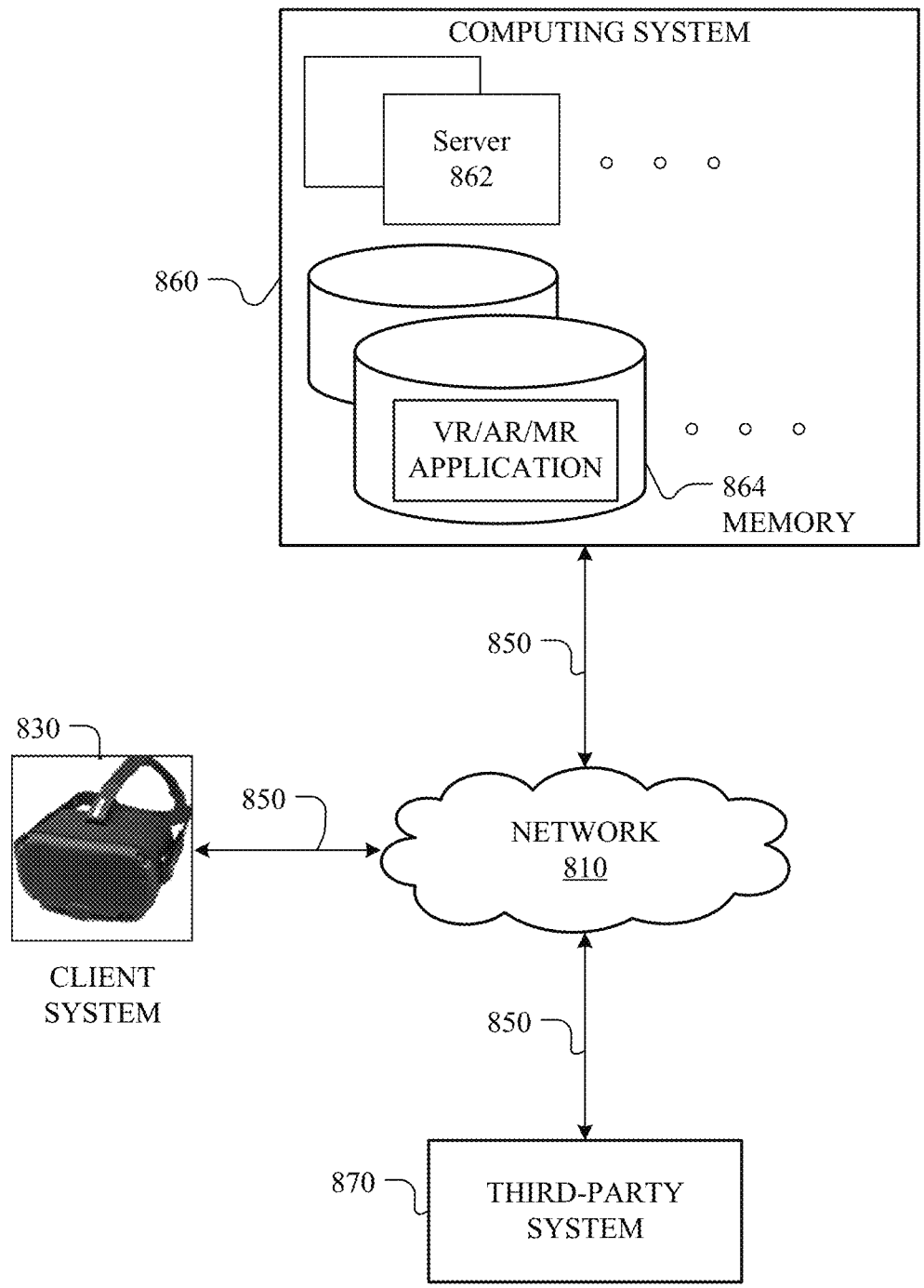
FIG. 8 illustrates of an example AR/VR/MR computing environment, according to various embodiments.

FIG. 8 illustrates an example augmented reality (AR) computing environment 800, according to various embodiments. VR/AR/MR computing environment 800 includes a client system 830, a computing system 860, and a third-party system 870 connected to each other by a network 810. Although FIG. 8 illustrates a particular arrangement of client system 830, computing system 860, third-party system 870, and network 810, this disclosure contemplates any suitable arrangement of client system 830, computing system 860, third-party system 870, and network 810. As an example and not by way of limitation, two or more of client system 830, computing system 860, and third-party system 870 may be connected to each other directly, bypassing network 810. As another example, two or more of client system 830, computing system 860, and third-party system 870 may be physically or logically co-located with each other in whole or in part. Moreover, although FIG. 8 illustrates a particular number of client systems 830, computing systems 860, third-party systems 870, and networks 810, this disclosure contemplates any suitable number of client systems 830, computing systems 860, third-party systems 870, and networks 810. As an example and not by way of limitation, VR/AR/MR computing environment 800 may include multiple client systems 830, computing systems 860, third-party systems 870, and networks 810.

In various embodiments, computing system 860 may generate, store, receive, and send data related to generating a VR/AR/MR environment, including, for example, and without limitation, visual data, audio data, tactile data, and so forth. In various embodiments, computing system 860 may include one or more of a personal computer, a server computer, a desktop computer, and so forth. Computing system 860 may be accessed by the other components of VR/AR/MR computing environment 800 either directly or via network 810. For example, client system 830 may receive one or more frames from the computing system 860 for display to a user.

In various embodiments, the computing system 860 may include a server 862 and/or a memory 864. The server 862 may execute the core tasks of the computing system 862. For example, the server 862 may include one or more processors, microprocessors, application-specific integrated circuits, and so forth that access data from memory 864, store data in memory 864 and process data. In addition, the server 862 may include a central processing unit (CPU) and a graphics processing unit (GPU). In various embodiments, the CPU may execute the core functionality of the server, including, for example, and not by way of limitation, processing user input, defining mesh geometries, modifying mesh geometries, outputting modified mesh geometries to a GPU for rendering, and so forth. The GPU may be configured to render mesh geometries received from the CPU. In particular, the GPU may implement a graphics pipeline for processing vertices defining mesh geometries received from the CPU. For example, the GPU may include one or more shaders that assemble vertices into polygons, rasterize mesh geometries, pixelate mesh geometries in pixel candidates, remove occluded surfaces from pixel candidates, output pixels for display, and so forth. In various embodiments, the GPU may be configured to render large numbers of triangles per frame. For example, the GPU may be configured to render of order $10^6$ or more triangles per frame. In addition, the GPU may satisfy stringent rendering performance guidelines, including, for example and not by way of limitation, rendering each frame of a VR/AR/MR illustration completely, without skipping frames and without generating rendering artifacts (e.g., tearing between frames). In various embodiments, the memory 864 may store frames, mesh geometries, and so forth, corresponding to a VR/AR/MR illustration (e.g., an animation) being rendered. For example, memory 864 may store one or more control points that define a mesh geometry. Additionally, or alternatively, memory 864 may store one or more mesh elements (e.g., vertices, edges, etc.) that define a mesh geometry.

In particular embodiments, third-party system 870 may be any type of system capable of interacting with client system 830 and/or computing system 860. For example, and not by way of limitation, third-party system 870 may be one or more of a wall-mounted speaker system, a mobile sensor system, a haptic actuator, an infrared sensor, and so forth. Third-party system 870 may be accessed by the other components of VR/AR/MR computing environment 800 either directly or via network 810. In particular embodiments, one or more client systems 830 may access, send data to, and receive data from computing system 860 or third-party system 870. The client system 830 may access computing system 860 or third-party system 870 directly, via network 810, or via a third-party system. As an example and not by way of limitation, client system 830 may access third-party system 870 via computing system 860.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, computing system 860, and third-party system 870 to communication network 810 or to each other. This disclosure contemplates any suitable links 850. In particular embodiments, one or more links 850 include one or more wirelines (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout VR/AR/MR computing environment 800. One or more first links 850 may differ in one or more respects from one or more second links 850.

The client system 830 may be any type of system capable of receiving input and/or delivering output, such as, for example and not by way of limitation, a head-mounted display, an augmented/virtual reality system, and so forth. In some embodiments, the client system 830 may receive information from one or more of computing system 860 and/or third-party system 870. For example, client system 830 may include one or more displays for outputting a rendered frame. In operation, client system 830 may receive pixel information corresponding to a rendered frame from the computing system 860. The pixel information may define one or more parameters (e.g., a color) for one or more pixels of a display included in the client system 830. Client system 830 may utilize the received pixel information to project the frame to a user via a display. In some embodiments, the client system may itself be configured to perform rendering tasks, such as generating mesh geometries for virtual objects based on their assigned simplification levels and rendering images using those mesh geometries.

In addition, client system 830 may include other devices that may deliver various types of visual, audio, and sensory information to a user. For example, and not by way of limitation, client system 830 may include one or more headphones that delivers audio signals to a user. In various embodiments, the computing system 860 may encode an audio signal and transmit the encoded audio signal to the client system 830 for output to a user. The client system 830 may decode the audio signal and further output the audio signal to the user via a speaker (e.g., a set of headphones). In some embodiments, the audio signal may be designed to match a visual characteristic of a VR/AR/MR illustration that s visually displayed to a user via a display. For example, and not by way of limitation, the audio signal may be modified by one or more head-related transfer functions in order to alter a user-perceived position of a source of an audio signal. In particular, the user-perceived audio source position may be altered to match a visually-displayed position of the source on a display of the client system 830.

Additionally, or alternatively, the client system 830 may output information to one or more of the computing system 860 and/or the third-party system 870. For example, the client system 830 may include one or more devices that transmit information to the computing system 860 and/or the third-party system 870. Devices may include, for example, and not by way of limitation, hand-held devices (e.g., a joystick), head-mounted devices (e.g., a head-mounted display), body-worn devices, and so forth. In various embodiments, the devices may output one or more types of signals, including, for example and not by way of limitation, infrared signals, optical signals, radio frequency (RFID) signals, near-field communication signals, and so forth, that are detected by the computing system 860 and/or the third-party system 870.

Figure 9:
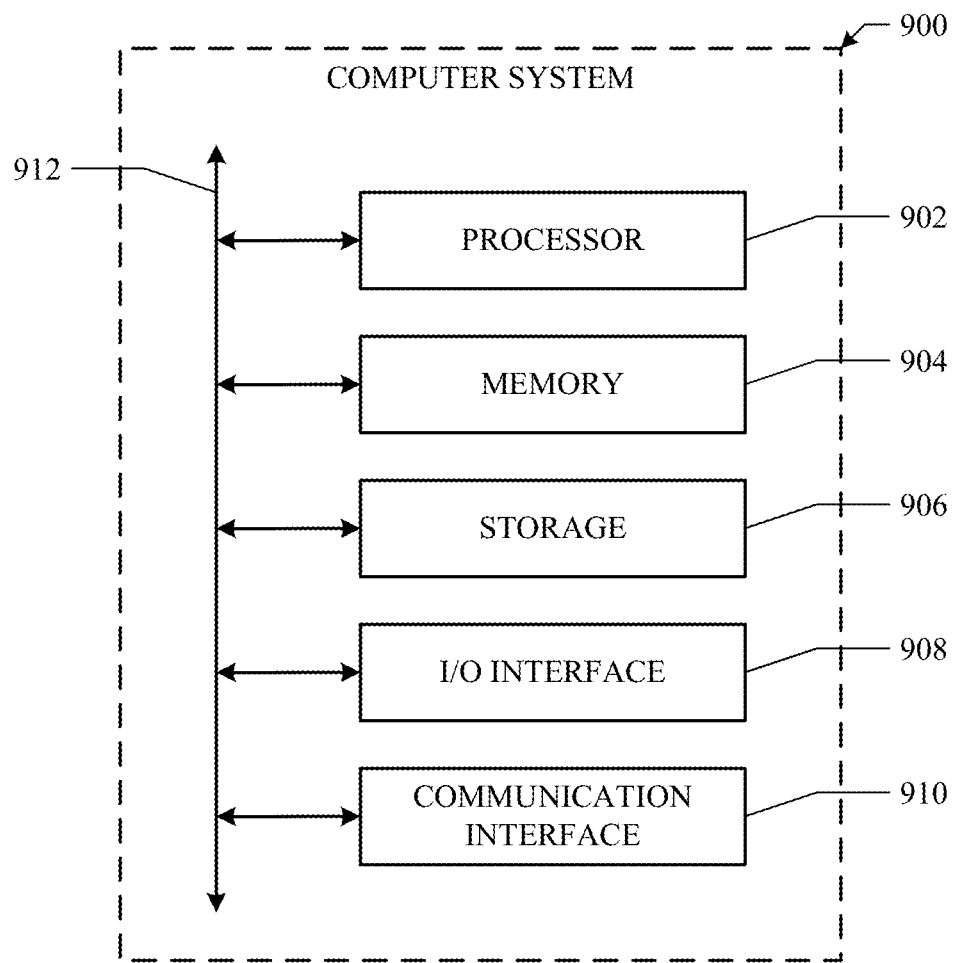
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates a particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by a computing system:
receiving a request to render an image of a virtual scene from a viewpoint, the image comprising at least one virtual object visible from the viewpoint;
determining a position of the virtual object relative to a lens used for viewing the image;
determining a number of pixels required for depicting the virtual object in the image;
determining a geometry simplification level for the virtual object based on the determined position of the virtual object relative to the lens, distortion characteristics associated with the lens at an area covered by the virtual object and the number of pixels required for depicting the virtual object in the image;
generating a mesh representation of the virtual object based on the determined geometry simplification level, wherein a number of polygons used in the mesh representation depends on the determined geometry simplification level; and
rendering the image of the virtual scene using at least the generated mesh representation of the virtual object.

2. The method of claim 1, wherein the number of polygons used in the mesh representation is lower when the virtual object is farther from a center of the lens.

3. The method of claim 1, wherein the number of polygons used in the mesh representation is higher when the virtual object is closer to a center of the lens.

4. The method of claim 1, further comprising:
determining, based on the determined position, a region of the image in which the virtual object would appear, wherein the geometry simplification level is associated with the region.

5. The method of claim 4, wherein the region is one of a plurality of regions of the image, wherein a predetermined geometry simplification level is associated with each of the plurality of regions based on a proximity of that region to a center of the lens.

6. The method of claim 1, wherein the determined position comprises a position of the virtual object relative to a center of the lens.

7. The method of claim 1, further comprising:
determining, based on the determined position, a region of the image in which the virtual object would appear; and
determining a pixel number threshold associated with the region, wherein the determination of the geometry simplification level is based on a comparison of the determined number of pixels required for depicting the virtual object and the determined pixel number threshold associated with the region.

8. The method of claim 1, further comprising:
determining a second position of a second virtual object relative to the lens;
determining a second geometry simplification level for the second virtual object based on the determined second position, wherein the second geometry simplification level associated with the second virtual object is different from the geometry simplification level associated with the virtual object; and
generating a second mesh representation of the second virtual object based on the determined second geometry simplification level, wherein a second number of polygons used in the second mesh representation depends on the determined second geometry simplification level, wherein the rendering of the image of the virtual scene further uses the generated second mesh representation of the second virtual object.

9. The method of claim 8,
wherein a center of the lens is farther from the second virtual object than from the virtual object, wherein the second geometry simplification level associated with the second virtual object causes more mesh simplification than the geometry simplification level associated with the virtual object.

10. The method of claim 9, wherein the geometry simplification level associated with the virtual object causes no mesh simplification of the mesh representation of the virtual object.

11. The method of claim 1, wherein the virtual object is one of a plurality of virtual objects that collectively form a larger virtual object in the virtual scene, wherein a plurality of geometry simplification levels is respectively determined for the plurality of virtual objects, wherein the plurality of geometry simplification levels is non-uniform.

12. The method of claim 1, wherein the mesh representation of the virtual object is procedurally generated based on the geometry simplification level.

13. The method of claim 1, wherein the image is one frame in a video.

14. The method of claim 13, wherein the generation of the mesh representation of the virtual object and the rendering of the image are performed while the video is being displayed.

15. The method of claim 1, further comprising:
accessing from memory a shape definition of the virtual object, wherein the generation of the mesh representation of the virtual object is further based on the shape definition.

16. A system comprising: one or more processors and one or more computer-readable non-transitory storage media coupled to one or more of the processors, the one or more computer-readable non-transitory storage media comprising instructions operable when executed by one or more of the processors to cause the system to:
receive a request to render an image of a virtual scene from a viewpoint, the image comprising at least one virtual object visible from the viewpoint;
determine a position of the virtual object relative to a lens used for viewing the image;
determine a number of pixels required for depicting the virtual object in the image;
determine a geometry simplification level for the virtual object based on the determined position of the virtual object relative to the lens, distortion characteristics associated with the lens at an area covered by the virtual object and the number of pixels required for depicting the virtual object in the image;
generate a mesh representation of the virtual object based on the determined geometry simplification level, wherein a number of polygons used in the mesh representation depends on the determined geometry simplification level; and
render the image of the virtual scene using at least the generated mesh representation of the virtual object.

17. The system of claim 16, where the one or more computer-readable non-transitory storage media further comprises instructions operable when executed by the one or more of the processors to cause the system to:
determine, based on the determined position, a region of the image in which the virtual object would appear; and
determine a pixel number threshold associated with the region, wherein the determination of the geometry simplification level is based on a comparison of the determined number of pixels required for depicting the virtual object and the determined pixel number threshold associated with the region.

18. One or more computer-readable non-transitory storage media embodying software that is operable when executed to cause one or more processors to:
receive a request to render an image of a virtual scene from a viewpoint, the image comprising at least one virtual object visible from the viewpoint;
determine a position of the virtual object relative to a lens used for viewing the image;
determine a number of pixels required for depicting the virtual object in the requested image;
determine a geometry simplification level for the virtual object based on the determined position of the virtual object relative to the lens, distortion characteristics associated with the lens at an area covered by the virtual object and the number of pixels required for depicting the virtual object in the image;
generate a mesh representation of the virtual object based on the determined geometry simplification level, wherein a number of polygons used in the mesh representation depends on the determined geometry simplification level; and render the image of the virtual scene using at least the generated mesh representation of the virtual object.

19. The media of claim 18, wherein the software is further operable when executed to cause the one or more processors to:

determine, based on the determined position, a region of the image in which the virtual object would appear; and determine a pixel number threshold associated with the region, wherein the determination of the geometry simplification level is based on a comparison of the determined number of pixels required for depicting the virtual object and the determined pixel number threshold associated with the region.

\* \* \* \* \*